(12) United States Patent
Casper et al.

(10) Patent No.: US 9,311,509 B2
(45) Date of Patent: Apr. 12, 2016

(54) CREATION AND DELIVERY OF ENCRYPTED VIRTUAL DISKS

(75) Inventors: Ryan Matthew Casper, Kennett, MO (US); Nitin Desai, Coral Springs, FL (US); Madhav Chinta, Pompano Beach, FL (US); Jitendra Deshpande, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 145 days.

(21) Appl. No.: 13/102,793

(22) Filed: May 6, 2011

(65) Prior Publication Data

US 2011/0276806 A1   Nov. 10, 2011

Related U.S. Application Data

(60) Provisional application No. 61/332,795, filed on May 9, 2010.

(51) Int. Cl.
| | |
|---|---|
| *G06F 21/00* | (2013.01) |
| *G06F 15/16* | (2006.01) |
| *G06F 17/30* | (2006.01) |
| *G06F 21/78* | (2013.01) |
| *G06F 21/60* | (2013.01) |
| G06F 3/06 | (2006.01) |
| G06F 9/455 | (2006.01) |

(52) U.S. Cl.
CPC .............. *G06F 21/78* (2013.01); *G06F 21/602* (2013.01); *G06F 3/067* (2013.01); *G06F 3/0665* (2013.01); *G06F 2009/45579* (2013.01)

(58) Field of Classification Search
USPC ....................... 713/189, 193, 194; 726/26–30; 711/161, 162
See application file for complete search history.

(56) References Cited

U.S. PATENT DOCUMENTS

| | | |
|---|---|---|
| 7,055,014 B1 | 5/2006 | Pawlowski et al. |
| 7,428,636 B1 | 9/2008 | Waldspurger et al. |

(Continued)

FOREIGN PATENT DOCUMENTS

| | | |
|---|---|---|
| EP | 0 770 950 A2 | 5/1997 |
| WO | WO-2006/057514 A1 | 6/2006 |
| WO | WO-2008/049008 A2 | 4/2008 |

OTHER PUBLICATIONS

Integrating Parallel File Systems with Object-Based Storage Devices, Devulapalli et al IEEE 2007.*

(Continued)

*Primary Examiner* — Luu Pham
*Assistant Examiner* — Jahangir Kabir
(74) *Attorney, Agent, or Firm* — Foley & Lardner LLP; John D. Lanza

(57) ABSTRACT

The present application is directed to methods and systems for receiving a request for a virtual disk and creating a virtual disk that includes the virtual disk attributes identified in the request or determined by an organization's security policies. The created virtual disk can then be encrypted and in some aspects, an encryption key for the encrypted virtual disk can be stored in an encryption key database. Upon creating and encrypting the virtual disk, the virtual disk can be transmitted to a client. The client, upon receiving the encrypted virtual disk, can mount the virtual disk into the client system. The encrypted virtual disk may be stored as a file within an unencrypted virtual disk, and the unencrypted virtual disk backed up to a local or remote storage location.

22 Claims, 5 Drawing Sheets

(56) References Cited

U.S. PATENT DOCUMENTS

| | | | |
|---|---|---|---|
| 8,687,814 B2* | 4/2014 | Nord | G06F 21/602 380/278 |
| 9,166,787 B2* | 10/2015 | Nord | G06F 21/602 |
| 2004/0030822 A1 | 2/2004 | Rajan et al. | |
| 2004/0098579 A1* | 5/2004 | Nakano et al. | 713/150 |
| 2006/0053260 A1* | 3/2006 | Kodama | 711/162 |
| 2006/0101204 A1 | 5/2006 | Bao | |
| 2007/0233868 A1 | 10/2007 | Tyrrell et al. | |
| 2008/0165957 A1* | 7/2008 | Kandasamy et al. | 380/44 |
| 2008/0320316 A1 | 12/2008 | Waldspurger et al. | |
| 2009/0216975 A1* | 8/2009 | Halperin et al. | 711/162 |
| 2009/0282266 A1* | 11/2009 | Fries et al. | 713/193 |
| 2011/0173427 A1* | 7/2011 | Merkin et al. | 713/2 |
| 2016/0004885 A1* | 1/2016 | Nord | G06F 21/602 713/193 |

OTHER PUBLICATIONS

VLSD Based Backup System for Internal Control, Tomono et al, IEEE.*
International Preliminary Report on Patentability on PCT/US2011/035603 dated Nov. 22, 3012.
International Search Report on PCT/US2011/035603 dated Nov. 30, 3011.
Written Opinion on PCT/US2011/035603 dated Nov. 30, 3011.
Chinese Office Action on 201180033491.4 dated Apr. 23, 2014.
European Search Report on 11781059.8 dated Apr. 10, 2014.
Chinese Office Action on 201180033491.4 dated Jul. 31, 2013.

* cited by examiner

CREATION AND DELIVERY OF ENCRYPTED VIRTUAL DISKS

RELATED APPLICATIONS

This present application claims priority to and the benefit of U.S. Provisional Patent Application No. 61/332,795, entitled "Creation and Delivery of Encrypted Virtual Disks," filed May 9, 2010, which is hereby incorporated by reference in its entirety.

FIELD OF THE INVENTION

The methods and systems described herein relate generally to generating virtual disks. In particular, the methods and systems relate to creating and delivering encrypted virtual disks.

BACKGROUND OF THE INVENTION

Permitting associates to bring their personal laptop or computer to work and use that laptop as their company computer has become popular with many corporations. In many instances, these programs allow an employee to use their personal computer in lieu of a company machine. While the program has many advantages, one of the large disadvantages of having an employee use their personal computer for work-related computing, is that employees often store sensitive company documents and application information to their generally unsecure personal computer. Memory on a personal laptop is typically unmanaged and it is difficult to enforce security policies when a user is not logged into a company network. Thus, systems and methods are needed to protect the confidentiality of corporate information on the user's computing device and enforce policies to protect the same.

In some instances, providing a secure storage repository on a client computer can be difficult. Often, those applications executing on the client to facilitate the display of remote applications do not have access to a local client's persistent storage or do not have the ability to partition the persistent storage or otherwise create a secure storage area. Although a secure storage area may be manually or automatically created on the client, and then manually or automatically locally encrypting the virtual disk, carrying out this process can require local disk creation and encryption software which may not be pre-installed. Conversely, if local encryption software is installed, it may not be up to corporate standards or requirements (e.g. the local encryption software can only perform 128-bit encryption, while the corporation requires 256-bit encryption). Additionally, local encryption software such as BitLocker, distributed by Microsoft Corporation of Redmond, Wash. as part of the Microsoft Windows line of operating systems; PGP Whole Disk Encryption, manufactured by Symantec Corporation of Mountain View, Calif.; or TrueCrypt, manufactured by the TrueCrypt Foundation of Henderson, Nev., typically encrypts an entire hard drive or volume. Thus, it may be difficult to draw a distinction between secure storage for corporate data and storage for the user's personal data (which may be secure from third parties due to whole-volume encryption, but not isolated from corporate data). Furthermore, full disk encryption doesn't provide a mechanism for centralized management and configuration for creating and distributing encrypted disks. Additionally, because the entire disk is encrypted, any backup system must be locally executed. Thus, systems and methods are needed to create, encrypt and deliver virtual disks from a centralized server to one or more clients.

SUMMARY OF THE INVENTION

Described are embodiments of methods and systems for providing a centralized service that can create, encrypt, configure, distribute, backup and delete virtual disks as if they were physical hard disks allowing centralized management of the entire lifecycle of the disks. Administrators may create an encrypted disk at a central location, and customize the disk using company-specific standards such as encryption and hashing algorithms, standard passwords, key files, and disk sizes. The encrypted virtual disks can be distributed from a central server and downloaded to a client computer where they can be mounted as though they were physical hard disks for isolated, encrypted local storage. In some embodiments, the client computer may be configured to periodically backup the virtual hard disk, and may be configured with a backup location, such as a network server. In one embodiment, the user of the client computer may be able to modify attributes of the virtual disk, such as access passwords and size. In a further embodiment, a policy engine may allow modification of one or more attributes of the virtual disk, responsive to administrator-specified configuration policies. In some embodiments, the centralized management system or client computer may be configured to delete the encrypted virtual hard disk. This may be done responsive to an administrator command, such as when an employee is terminated, or may be done responsive to a command from a management service on the client computer. For example, the management service on the client computer may periodically attempt to contact a licensing or authentication server or the centralized management system. Failure to successfully contact the server or system within a predetermined period of time may indicate that the laptop has been stolen or lost or otherwise compromised, and responsive to expiration of the predetermined period of time without successful contact, the management service on the client computer may delete the encrypted virtual disk.

In some embodiments, the virtual disk creation and encryption methods can be used to create a custom virtual disk using customization information identified by a client request, e.g. disk size, encryption passwords, encryption keys and storage types. In other embodiments, the methods and systems can include a method for storing an encryption recovery key for an encrypted virtual disk. The key, in some embodiments, can be stored in a database or local storage before delivering the virtual hard disk to the client. Administrators can use the key to recover encrypted data on the virtual disk if the encryption password is lost or stolen. In yet another embodiment, delivery of an encrypted virtual disk to a client can take place over a network using an encrypted network protocol. In still another embodiment, requests for an encrypted disk can be queued and processed at a later time, and a disk creator carrying out the methods described herein can be scheduled according to a disk creation schedule. In some embodiments, queued requests can be attended to when another worker server becomes available.

Encrypted disks may be backed up, either locally or to a central location. In some embodiments, because a client computer operating system may have difficulty backing up an encrypted volume, the encrypted volume may be placed inside a second virtual hard disk, which may be backed up.

In one aspect, the present disclosure is directed to a method for centralized encrypted virtual disk delivery from a server to a client device. The method includes receiving, by a virtual disk creator executing on a server, a request for a virtual disk from a client device. The method also includes generating, by the virtual disk creator, the virtual disk responsive to the request. The method further includes encrypting, by the virtual disk creator, the generated virtual disk using an encryption key based on the received request. The method also includes storing, by the virtual disk creator, a disk identifier and the encryption key to a centralized database. The method also includes transmitting, the virtual disk creator, the encrypted virtual disk to the client device.

In some embodiments of the method, the request for a virtual disk from the client device comprises one or more of the following: a size of the requested virtual disk, a type of encryption to be applied to the virtual disk, a strength of the encryption to be applied, an encryption password to be used, an encryption key to be used and a type of storage. In a further embodiment, the method includes encrypting, by the virtual disk creator, the virtual disk using an attribute of the request for the virtual disk from the client device.

In other embodiments, the method includes queuing, by the virtual disk creator, the request for a virtual disk from the client device until the virtual disk creator has availability to respond to the request. In still other embodiments, the method includes transmitting, by the virtual disk creator, the encrypted virtual disk over a secure network using an encrypted network protocol.

In one embodiment, the method includes receiving, by the virtual disk creator, the request from the client device generated responsive to a determination that an application executed by the client device requires a secure storage area. In another embodiment, the method includes determining that the application requires a secure storage area responsive to the application comprising one of a remote-display protocol client and a streamed application.

In other embodiments, the method includes receiving, by the virtual disk creator, the request from the client device generated responsive to a determination that no secure storage area exists on the client device. In still other embodiments, the method includes receiving, by the server from the client device, a second, unencrypted virtual disk comprising the encrypted virtual disk; and storing, by the server, the second, unencrypted virtual disk in a backup storage location. In a further embodiment, the method includes receiving the second, unencrypted virtual disk from the client device responsive to a backup policy executed by the client device.

In another aspect, the present disclosure is directed to a system for centralized encrypted virtual disk delivery from a server to a client device. The system includes a computing device in communication with a client device, executing a virtual disk creator. The virtual disk creator is configured to receive a request for a virtual disk from a client device, and generate the virtual disk responsive to the request. The virtual disk creator is also configured to encrypt the generated virtual disk using an encryption key based on the received request. The virtual disk creator is further configured to store a disk identifier and the encryption key to a centralized database, and transmit the encrypted virtual disk to the client device.

In one embodiment of the system, the request for a virtual disk from the client device comprises one or more of the following: a size of the requested virtual disk, a type of encryption to be applied to the virtual disk, a strength of the encryption to be applied, an encryption password to be used, an encryption key to be used and a type of storage. In a further embodiment, the virtual disk creator is further configured to encrypt the virtual disk using an attribute of the request for the virtual disk from the client device.

In some embodiments, the virtual disk creator is further configured to queue the request for a virtual disk from the client device until the virtual disk creator has availability to respond to the request. In other embodiments, the virtual disk creator is further configured to transmit the encrypted virtual disk over a secure network using an encrypted network protocol. In still other embodiments, the virtual disk creator is further configured to receive the request from the client device, the request generated responsive to a determination that an application executed by the client device requires a secure storage area. In a further embodiment, the application executed by the client device comprises one of a remote-display protocol client and a streamed application.

In one embodiment, the virtual disk creator is further configured to receive the request from the client device, the request generated responsive to a determination that no secure storage area exists on the client device. In another embodiment, the computing device executes a backup service. The backup service is configured to receive a second, unencrypted virtual disk comprising the encrypted virtual disk, and store the second, unencrypted virtual disk in a backup storage location. In a further embodiment, the second, unencrypted virtual disk is sent responsive to a backup policy executed by the client device.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
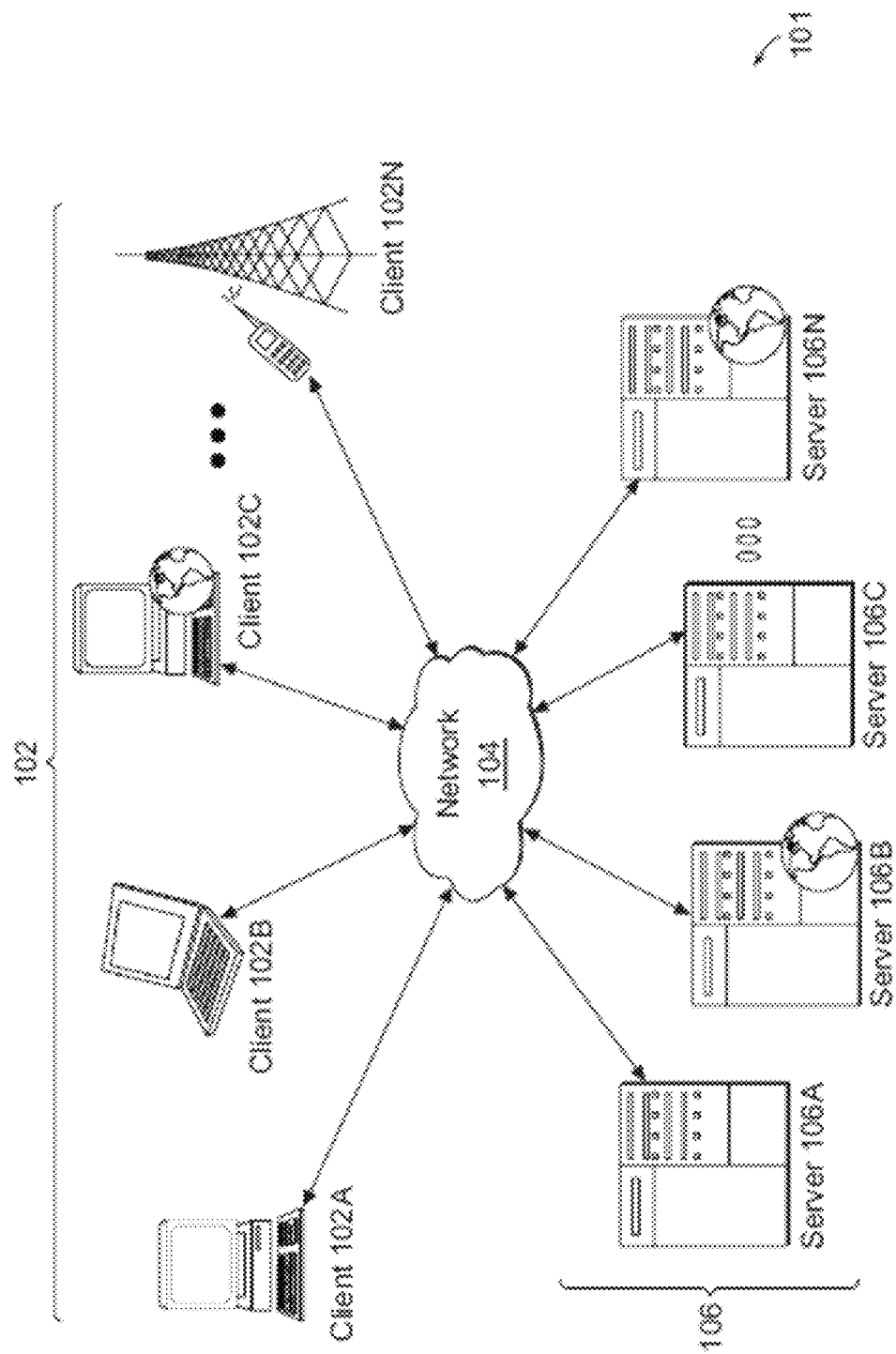
FIG. 1A is a block diagram illustrative of an embodiment of a remote-access, networked environment with a client machine that communicates with a server.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

In enterprises or companies with remote or traveling users with mobile or personal computing devices, it may be desirable to segregate or partition corporate data from personal data of the users on said computing devices for security purposes. Users may create local volumes, folders, or virtual hard disks for the corporate data and encrypt these volume, folders or virtual hard disks using software on the user's computing device. This allows every user to have independent encryption keys, which is useful: if a first user's computing device is compromised, the encryption key cannot be used for accessing a second user's encrypted information on the second user's computing device. However, local creation requires the user to have encryption software installed and licensed, which may not be available, particularly on smart phones or other mobile devices. Similarly, local creation may be processor intensive, taxing the resources of these devices. Additionally, local creation results in encrypted volumes that are inaccessible to administrators, if the user forgets the password or loses the key. Administrators can avoid these issues by creating and encrypting a virtual hard disk on a central server, providing it to each user that requests the disk. However, this results in every user having a disk encrypted with the same key, increasing the possibility of multiple users being compromised in the same attack.

Accordingly, in some embodiments of the methods and systems described herein, a centralized service can create and encrypt virtual disks for use by client computers, responsive to and based on client requests. The client computers can mount these encrypted virtual disks as if they were physical hard disks for isolated and encrypted local storage. The virtual disks may be customized during creation by default size, encryption passwords, encryption keys, and storage types. The centralized service may store an encryption recovery key in a database or local storage before delivering the virtual hard disk to the client, allowing the administrator of the delivery service to have a means to recover encrypted data on the virtual disk should the encryption password become lost or forgotten. In some embodiments, the encrypted virtual disk may be delivered to the client via an encrypted network protocol, such as SSL, preventing interception or man-in-the-middle attacks. In another embodiment, the centralized service may queue disk requests from clients and process them at a later time or schedule the disk creation on another server within a server farm or cloud, distributing processing load.

Prior to discussing specifics of creating, delivering, and maintaining encrypted virtual hard disks, it may be helpful to first discuss an exemplary computing environment. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
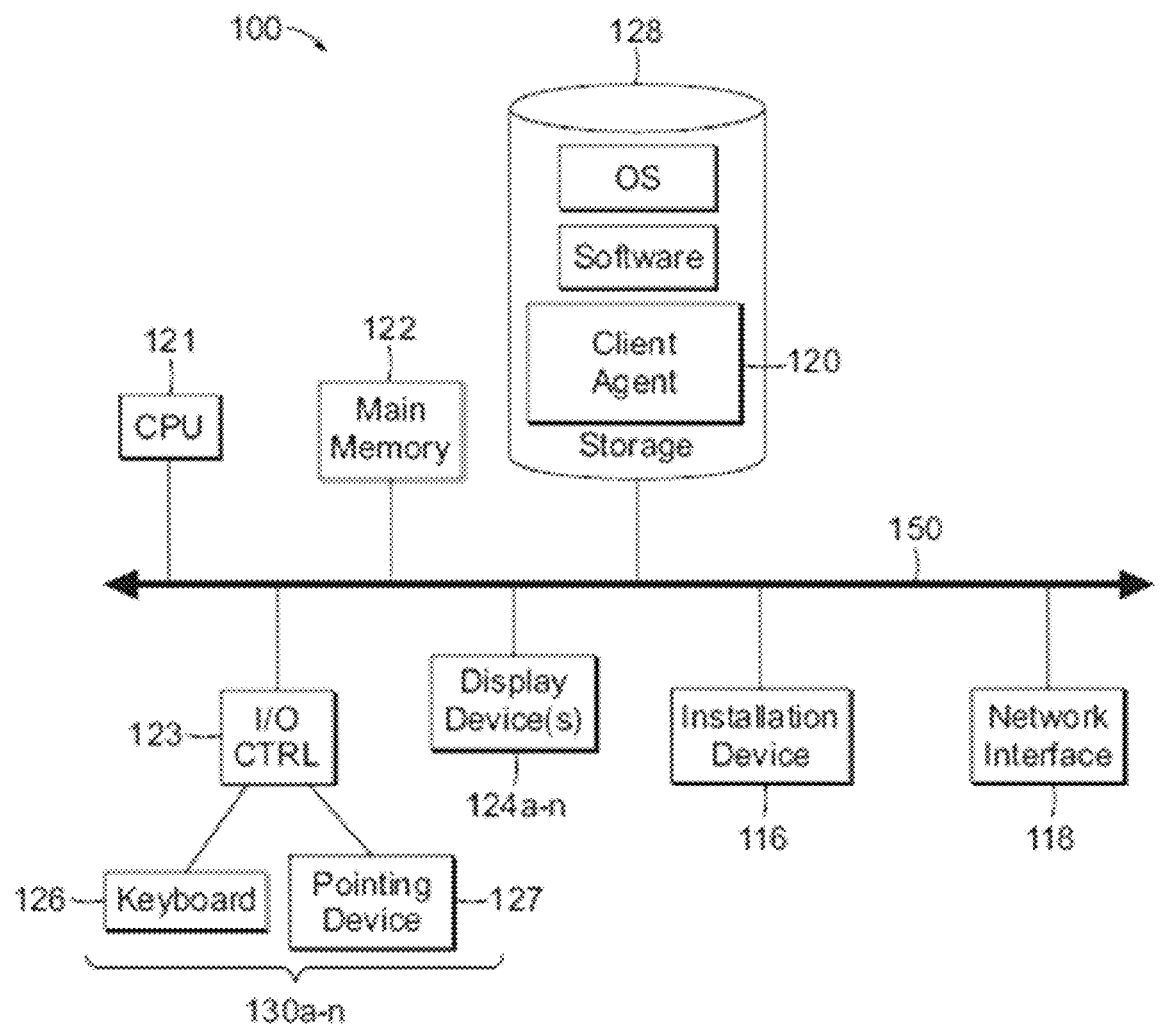
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
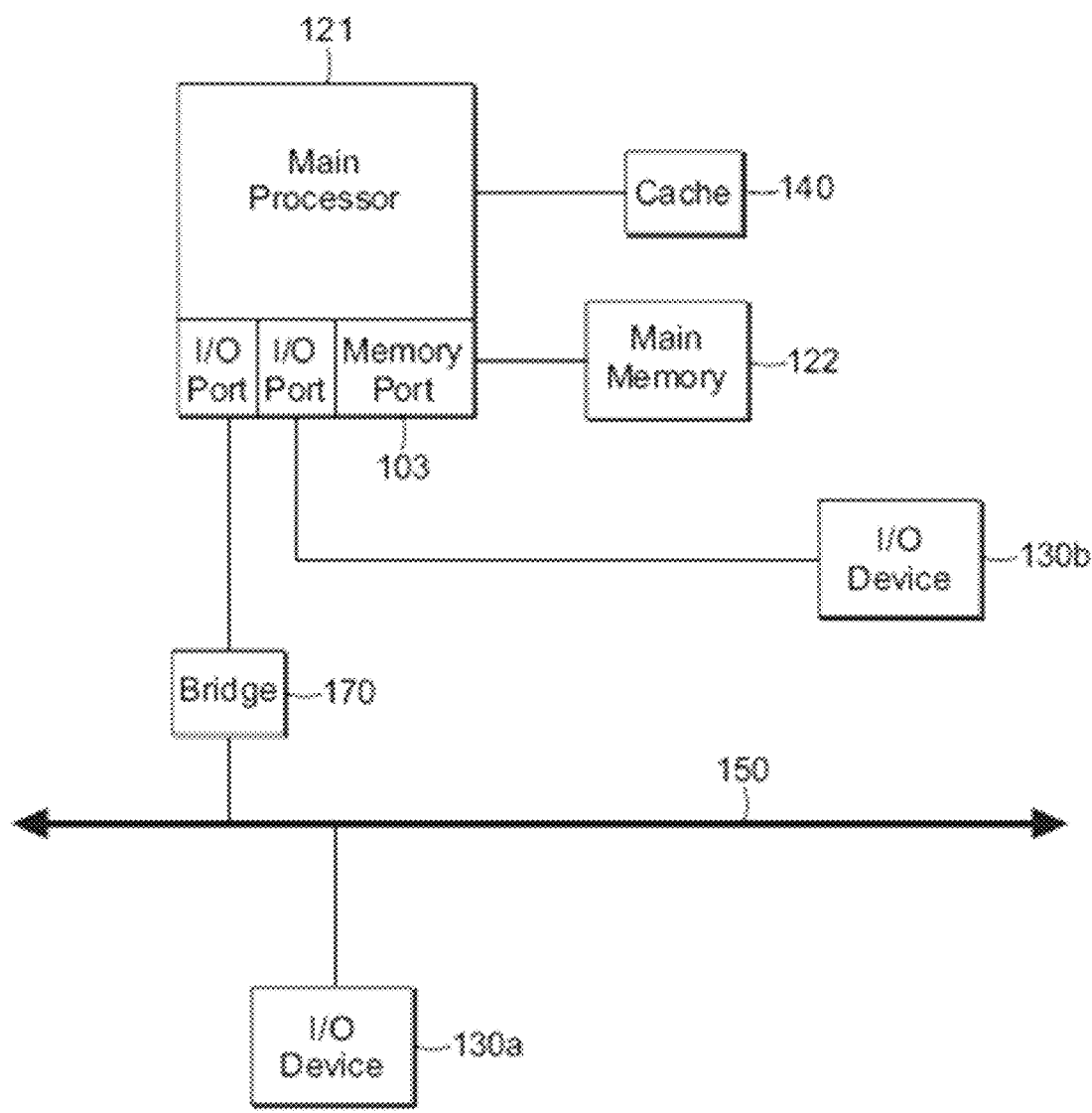

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2:
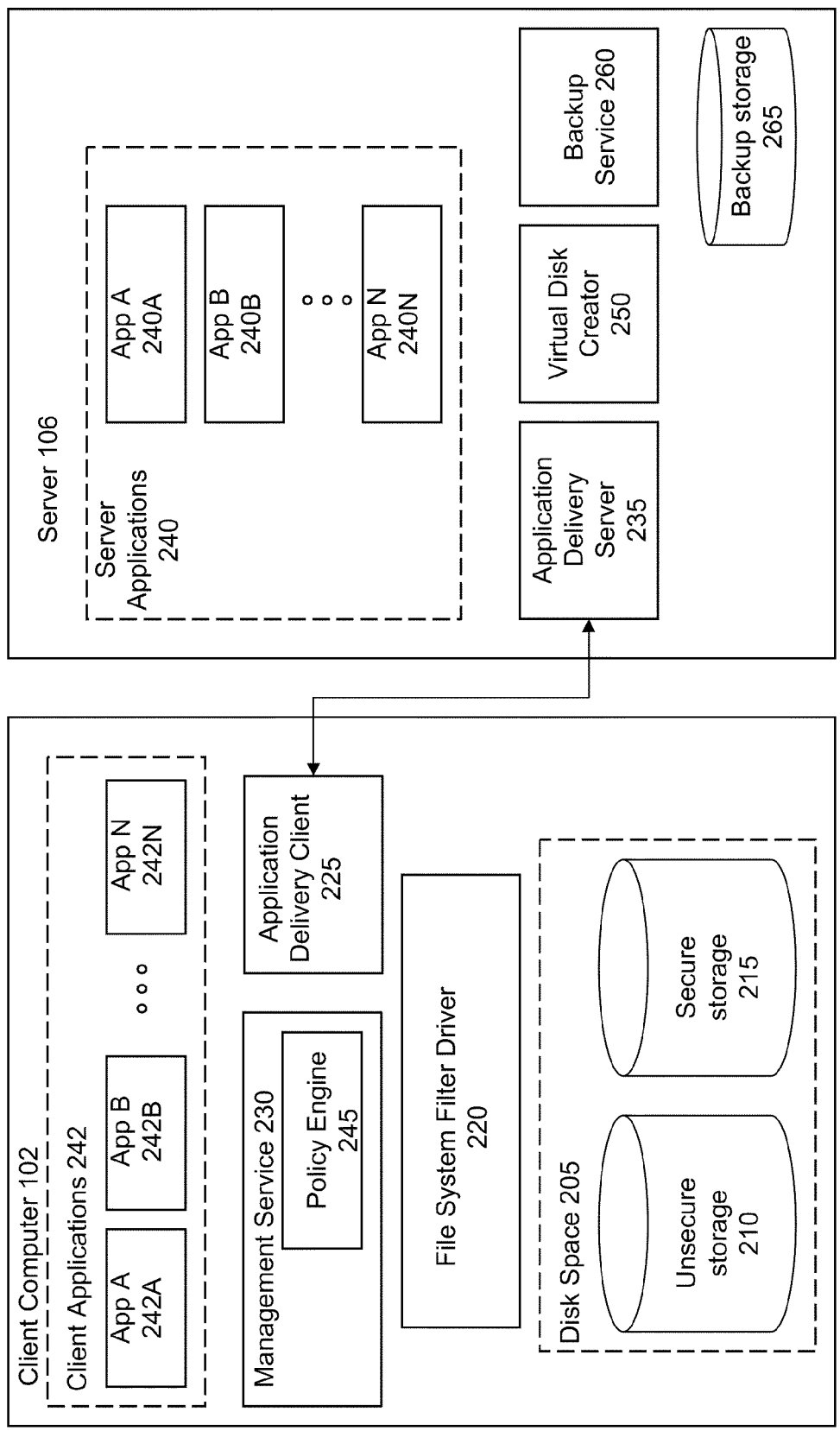
FIG. 2 is a block diagram illustrative of an embodiment of a system for creating and deploying encrypted virtual disks.

Illustrated in FIG. 2 is one embodiment of a system for forcing or requiring trusted corporate applications to save their data only in designated secure disk space. In some embodiments, the system can include a client computer 102 and a server 106 that communicate via a network 104. The client can include a disk space 205 that can further include an unsecure disk space 210 and a secure disk space 215. Executing on the client can be a file system filter driver 220, an application delivery client 225 and a management service 230. The server can execute one or more applications 240A-

240N (generally referred to as server applications 242 or applications 240), and can also execute an application delivery server 235. The client can execute one or more applications 242A-242N (generally referred to as client applications 242 or applications 242), which may be locally installed applications, or applications installed in storage attached to client computer 102. In some embodiments, a virtual disk creator 250 can execute on the server 106 to intercept client requests and create virtual disks.

Further referring to FIG. 2, and in more detail, in one embodiment the system can include a client computer 102 and a server 106. The client computer 102 can be any computing device 100 described herein and can be any client 102 described herein. Similarly, the server 106 can be any computing device 100 described herein and can be any server 106 described herein. In some embodiments, the server 106 can be a server farm that includes one or more servers 106. The client 102 and the server 106 can communicate over a network 104 such as any network 104 described herein.

In some embodiments, client 102 may execute one or more applications 242A-242N (generally applications 242). In other embodiments, server 106 may execute one or more applications 240A-240N (generally, applications 240), which may be delivered to the client via application delivery client 225 and application delivery server 235. In some embodiments the application delivery client 225 executing on the client 102 can be an application, client or program that can receive application output, such as graphical display output or other data output, from a server application delivery client 235 executing on the server 106. The application delivery client 225 of the client 102 can receive application output and display the application output in an application window on the client 102. In some embodiments, the application delivery client 225 can facilitate the creation of a virtual channel between the client 102 and the server 106, and can facilitate communication between the application delivery system of the client 102 and the application delivery system of the server 106. The application delivery client 225 of the client computer 102 can communicate with the application delivery client 235 of the server 106 and can transmit and receive file access requests. In some embodiments, the application delivery client 225 can be an ICA client manufactured by CITRIX SYSTEMS. In other embodiments, application delivery client 225 may be referred to as a remote desktop client, a desktop presentation client, or any similar type of client, and may communicate with server 106 via a presentation layer protocol such as ICA or RDP.

The application delivery server 235 of the server 106 can execute on the server 106 and can interface with applications 240 executing on the server 106. In some embodiments, the server application delivery server 235 can intercept, retrieve or receive graphical application output, e.g. draw commands issued by an application 240, generated by an application 240 and can forward the application output together with any related image data to the application delivery client 225 of the client 102. The application delivery client 225 of the client computer 102 can use the application output and image data to redraw the application as it would be displayed on a display screen of the server 106. In some embodiments, the application delivery server 235 can be an ICA server manufactured by CITRIX SYSTEMS. In some embodiments, the application delivery client 225 of the client 102 can communicate with the application delivery server 235 over one or more virtual channels and one or more transport layer connections.

In still other embodiments, application delivery client 225 and application delivery server 235 may comprise applications for streaming an application 240 from server 106 for execution on client computer 102. In yet still other embodiments, application delivery client 225 and application delivery server 235 may comprise applications, services, agents, or other executable code for downloading an application to client computer 102 for online or offline execution. Accordingly, an application may be executed at server 106 with output transmitted to client 102; may be streamed for execution by client 102; may be downloaded or otherwise transferred to client 102 for local execution; or may be installed on client 102, without departing from the scope of this application.

The applications 240 and 242 (referred to generally as server applications 240 or client applications 242) can be any application. In some embodiments, the application 240 can include any application described herein, or any other application. In some embodiments, applications 240 executing on server 106 can interface with the application delivery server 235 by transmitting application output to the application delivery client 235. In other embodiments, as discussed above, applications 242 may execute on the client 102 and/or may be streamed to client 102 for execution by client 102.

In some embodiments, the client computer 102 can include disk space 205 that can include unsecure disk space or an unsecure storage location 210 and secure disk space or a secure storage location 215. Although illustrated within client computer 102, disk space 205 may include both physical disks included in the client computer 102, external physical disks available to the client computer 102, including dedicated disks and network disks, and virtual disks available to the client computer 102. Although referred to as disks, in some embodiments, disk space 205 may comprise flash storage, magnetic storage, optical storage, combinations of any of these, or any other type and form of storage device. Furthermore, although only one unsecure storage location 210 and one secure storage location 215 are illustrated, in many embodiments, multiple unsecure and secure storage locations may exist. For example, a user working for multiple corporations may utilize a secure storage location for each corporation, to keep confidential data of one organization isolated from data of the other. In one embodiment, unsecure disk space 210 may include disk space identified by the file system filter driver 220 or management service 230 as unsecure storage. In other embodiments, the unsecure disk space 210 can be marked as unsecure storage. Similarly, in some embodiments, disk space 205 may include secure disk space 215 which may be marked as secure storage, or identified by a file system filter driver 220 or management service 230 as secure storage.

In some embodiments, marking or otherwise identifying disk space 205 as unsecure 210 or secure 215 may include identifying volumes or drives in the disk space 205 as secure or unsecure by the file system filter driver 220, the application delivery client 225 or the management service 230. For example, in one embodiment, disk space 205 may be partitioned into one or more drives. For example, in a Windows operating system environment, disk space 205 may be partitioned into an unsecure A:\ drive, a second unsecure C:\ drive and a secure X:\ drive. Other drive letters may be used, and in other operating systems, other identifiers of the disk space may be utilized. In some instances, the file system filter driver 220, the application delivery client 225 or the management service 230 may identify in a table, index, database, or list whether each drive is secure or unsecure. For example, the A:\ and C:\ drives may be identified as unsecure, while the X:\ drive can be identified as secure. In other embodiments, a drive or partition may be identified as secure or unsecure via a property of the drive, an identifier, a predetermined bit in a drive identifier, a flag, or any other type and form of identification.

In one embodiment, an application delivery client 225 installed on the client 102, management service 230, or other client agent not illustrated may partition the disk space available on the client 102 to create a secure storage space 215 and an unsecure storage space 210. In other embodiments, upon booting, the application delivery client 225, management service 230 or other client agent not illustrated may partition the disk space available on the client 102 to create a secure storage space 215 and an unsecure storage space 210. In still other embodiments, the application delivery client 225, management service 230, or other client agent may create a secure disk space 215 by allocating a range of memory addresses as secure memory locations. Furthermore, although discussed as disk space, in some embodiments, the systems and methods discussed herein may be applied to managing secure and unsecure locations in memory, such as RAM.

In some embodiments, the file system filter driver 220 may interact with the application delivery client 225 or other application 240 executing on the client to intercept requests to read information from or write information to local storage on the client computer 102 and process the request according to the methods and systems described herein. The file system filter driver 220 can interact with the management service 230 and the application delivery client 225 or other application 240 to receive requests and obtain security information pertaining to which applications should be serviced with secure disk space 215 and which applications should be serviced with unsecure disk space 210. In one embodiment, the file system filter driver 220 can intercept the request, determine whether the data should be stored to a secure disk space 215 or unsecure disk space 210 and process the request by storing the information in either of the two storage areas. For example, the file system filter driver 220 can intercept a request issued by a trusted application executing on the server 106 and remotely presented by the application delivery client 225 or a trusted application executing on the client 102. Upon determining that the source application that generated the request is a trusted application that requires secure storage, the file system filter driver 220 can store the application data and other information in a secure disk space 215 on the client 102. In other embodiments, the file system filter driver 220 may intercept a request issued by a non-trusted application executing on the server or client to store application data. The file system filter driver 220 may allow the request to store data in an unsecure location, or may deny the request to store data in a secure location, responsive to the application being a non-trusted application. In some embodiments, the file system filter driver 220 can interact directly with streamed applications, corporate delivery applications, applications delivered by App-V, or other similar applications.

In some embodiments, a management service 230 may execute on the client 102 and can interface with the file system filter driver 220 and the application delivery client 225. In some embodiments, the management service 230 may comprise an application, server, service, daemon, routine, or other executable code, and may execute in user-mode or kernel-mode. In some embodiments, management service 230 may act as or comprise a policy engine. The management server 230 or a policy engine of the management service may manage the security policies and other management policies that determine which applications should be identified as trusted and which applications should be identified as not trusted. In some embodiments, the management service 230 may execute within the application delivery client 225 as a policy engine of the application delivery client and may be used to determine whether to redirect data generated by an application to a secure storage space 215. In other embodiments, the management service 230 or a policy engine of the management service 230 may be used to identify an application executing on the client as a trusted or non-trusted application. In one embodiment, the management service 230 can further manage which memory volumes, memory address ranges or drives are considered unsecure disk space 210 and which are considered secure disk space 215. In some embodiments, a corporate administrator can set policies to mark certain applications as trusted. Additional folders can also be specified as trusted and therefore needing to be enabled for automatic redirection.

In one embodiment, management service 230 or a policy engine may identify an application as a trusted application responsive to a user credential of the user executing the application. For example, in one embodiment, the user may be required to log in prior to executing the application as a trusted application. If the user does not log in, the application may be executed as a non-trusted application. In another embodiment, the application may be executed by a root or administrative user, and may be identified as a trusted application responsive to these user privileges. In yet another embodiment, the application may be provided by a server 106 and be identified as a trusted application by being provided by the server. For example, remotely executed applications or streamed applications, or applications downloaded from a corporate server, may be identified as trusted, while applications installed locally by the user or obtained elsewhere may be identified as non-trusted. In some embodiments, an application may be trusted or non-trusted depending on execution parameters of the session. For example, as discussed above, a user may be required to log in to execute the application as a trusted application. Depending on whether the user has logged in or not, the application may be executed either as a trusted application or a non-trusted application. This may be done to avoid requiring multiple instances of identical applications installed.

In a further embodiment, management service 230 or a policy engine may further comprise functionality for locking the secure storage location, responsive to the client not having contacted the server or another computing device, such as an authentication server, within a predetermined time period. In some embodiments, server 106 or another server may operate a centralized management service, ticket authority, licensing server, or other service, and the management service or policy engine may lock the secure storage location responsive to the client not having contacted the centralized management service within a predetermined time period. This may be done to provide a dead-man switch to control corporate data on mobile devices, particularly in instances where the user owns the mobile device. For example, a user with a laptop may transfer corporate data to the laptop and work on it in the secure storage location, either staying connected to a corporate network or working offline and intermittently connecting to synchronize files or retrieve email. If the user leaves the company, typically a corporate employee would be required to obtain access to the user's laptop to remove or verify removal of corporate files. This may be difficult with remote users, or due to circumstances of the user's departure. Accordingly, if the user does not log in to the corporate network within a predetermined time period (for example, if their account is disabled on termination), management service 230 or the policy engine may disable the secure storage location, deny read/write access to the data stored within the location, or erase or overwrite the secure storage location.

In some embodiments, a virtual disk creator 250 may execute on the server 106 to intercept client requests to create or deploy virtual hard disks. The virtual disk creator 250 may comprise an application, service, server, daemon, logic, routine, or other executable code for creating, deploying, and managing virtual hard disks. In some embodiments, virtual disk creator 250 may comprise an encryption engine. In one embodiment, the virtual disk creator 250 can communicate directly with the application delivery client 225 executing on the client 102. The virtual disk creator 250 can, in some embodiments, can execute substantially perpetually on the server 106. In other embodiments, the virtual disk creator 250 can wait for client requests to come over a secure network connection (e.g. SSL), where the request can include information on the size of the request virtual disk, the encryption strength and the encrypted disk size. The virtual disk creator 250 can create the virtual disk using virtual disk creation methods, such as the virtual hard disk (VHD) API. In some embodiments, the virtual disk creator 250 may encrypt the created virtual disk.

The methods and systems discussed herein also provide capabilities for backing up an encrypted disk. Typically, encrypted disks are not recognized by operating systems such as Microsoft Windows as a "true" volume for the purpose of backing up the volume. For example, Windows may not recognize Truecrypt encrypted volumes as true volumes for backup. In some embodiments, this can be solved by placing the encrypted disk file (e.g., the .tc file for Truecrypt encrypted disks) inside a VHD file. The VHD file can then be backed up as a true volume, that happens to contain an encrypted volume that can be separately mounted. In some embodiments, the VHD file may be backed up using a block-based, differential backup, also known as a snap-shot backup, allowing support for in-use files. The backup is similarly a VHD file that can be easily mounted, and from which data can be easily recovered.

In some embodiments, backing up the VHD file may comprise backing up the VHD file according to a periodic schedule set by an administrator of the system. In many embodiments, backing up the VHD file may comprise backing up the file to a central location or server. In one such embodiment, an administrator may delete the encrypted data from the central location or server, allowing management of the entire encrypted disk lifecycle from creation to deletion.

In some embodiments, server 106 may execute a backup service 260. Backup service 260 may comprise an application, service, server, daemon, routine, or other executable logic for receiving backup virtual disks from one or more client computers, and storing the backup virtual disks in a backup storage location 265. Although shown on server 106, in many embodiments, backup storage location 265 may comprise an external storage device, a RAID array, a network storage device, a cloud storage service, or other storage devices. In many embodiments, backup service 260 may store and retrieve backup virtual hard disks in backup storage 265. In some embodiments, backup service 260 may delete backup virtual hard disks in backup storage 265, to manage the amount of storage used, or responsive to a command from an administrator to delete the backup or backups.

Figure 3:
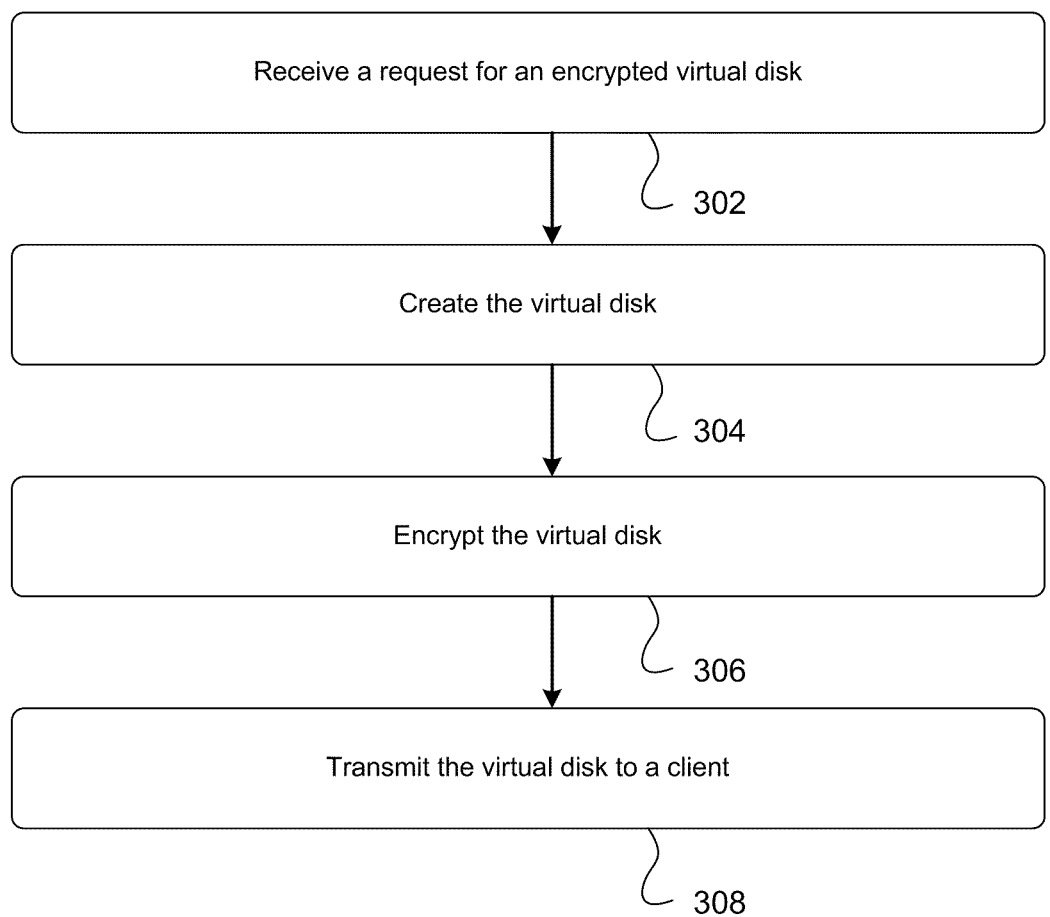
FIG. 3 is a flow diagram illustrative of an embodiment of a method for creating and deploying encrypted virtual disks.

Illustrated in FIG. 3 is one embodiment of a method for centralized encrypted virtual disk delivery. A virtual disk creator 250 executing on a server 106 receives or intercepts a request for an encrypted virtual disk (Step 302). In some embodiments, the virtual disk creator 250 can execute within the context of the application delivery client 235 such that the virtual disk creator 250 can intercept any requests issued by a client 102 to the server 106 for an encrypted virtual disk. In other embodiments, the virtual disk creator 250 may receive requests from a management service, a client agent, or another application executing on the client. The client 102, in some embodiments, can issue the request responsive to determining that an application requires a secure storage area. In other embodiments, the client 102 can issue the request responsive to determining that no secure storage area exists on the client 102. The request issued by the client, in some embodiments, can include virtual disk information such as the size of the requested virtual disk, the type of encryption to be used, the strength of the encryption to be applied, encryption passwords to be used, encryption keys to be used, and the type of storage. In other embodiments, the request may comprise user credentials, such as a user name, user password, user identifier, or other information, and/or machine credentials, such as a machine identifier, operating system type and version, management service version or capabilities, MAC address, or any other type and form of information. In some embodiments, the request can be transmitted from the client 102 to the server 106 and can be transmitted over a secure network (e.g. SSL.) In still other embodiments, can deliver the request using an encrypted network protocol.

The disk creator 250, in some embodiments, can respond to receiving the request by queuing the request. In these embodiments, the disk creator 250 can queue the requests until a later point in time, or until the disk creator 250 has availability to respond to the requests. In still other embodiments, the disk creator 250 can queue the requests and re-issue them to another disk creator executing on a different server.

Upon receiving the request, the disk creator 250 can create a virtual disk (Step 304). The virtual disk can be created using a virtual hard disk creator API, such as the VHD API provided as part of Windows 7 Operating System by Microsoft Corporation. In other embodiments, the disk creator 250 can execute virtual disk creation functions that can create the virtual disk. In one embodiment, the virtual disk creator 250 can create the virtual disk according to the virtual disk attributes specified in the client request. For example, if the client request specified a disk size and type of storage, the virtual disk creator 250 can create a virtual disk having that disk size and storage type. In some embodiments, the virtual hard disk may be created at a minimum size or very small size, and may be created as a dynamically-sized disk rather than a fixed-size disk. This may be done to reduce bandwidth requirements to transfer the disk to the client. For example, a very small disk, such as 10 MB, may be generated and encrypted at the server, and may be transferred to the client, where it may be expanded to a much larger size, such as several GB. In a further embodiment, the disk may be expanded over time as a user of the client writes data to the disk.

The disk creator 250, upon creating the virtual disk, can encrypt the virtual disk (Step 306). In some embodiments, the virtual disk creator 250 can encrypt the virtual disk using encryption technologies such as Bitlocker or TruCrypt. In other embodiments, the virtual disk creator 250 can encrypt the virtual disk using any whole-disk encryption technology. The virtual disk creator 250 can, in some embodiments, encrypt the virtual disk according to the encryption attributes specified in the client request. For example, if the request specifies that a particular encryption password should be used to encrypt the disk, the disk creator 250 can encrypt the virtual disk using that encryption password. In other embodiments, an administrator of the system may set predetermined encryption parameters to be used when encrypting the disk, such as specific encryption and hashing algorithms to be used, including bit length and block sizes, and passwords or key files to be used. In a further embodiment, the administrator may set a policy allowing the user to change the virtual hard disk password or encryption key.

In some embodiments, the disk creator 250 can generate an encryption key when the disk creator 250 encrypts the virtual disk. The disk creator 250 can then store the encryption key into a local database or storage. Thus, if the virtual disk encryption password is lost, the stored encryption key can be used to obtain data stored in the encrypted virtual disk. Storing the encryption key to the local database or storage can include writing the disk identifier and the encryption key to a local database.

Typically, a virtual hard disk may be created and encrypted and stored on a file share for downloading and use by multiple users. However, this requires using the same virtual hard disk and same encryption key for the multiple users, reducing security of the encryption key used. Additionally, the disk cannot be easily customized. Thus, in some embodiments, the virtual hard disk creator may use an encryption key comprising information received by disk creator 250 as part of the request for an encrypted virtual hard drive. For example, the key may include one or more user credentials, such as user name and password, one or more machine credentials, such as a machine ID or other information, and/or one or more request attributes, such as a timestamp of the request, a sequence ID of the packet containing the request, etc. These attributes may be used to both add randomness to the key, as well as creating request-specific encryption keys. As noted, the encryption key may be stored in case the user loses a password for the virtual hard disk. Because the encryption key is specific to the virtual hard disk created in response to the request, in some embodiments, the encryption key may be stored with an identifier of the specific virtual hard drive encrypted with the key.

Upon encrypting the virtual disk, the disk creator 250 can transmit the encrypted virtual disk to a client 102 (Step 308). In some embodiments, the creator 250 can transmit the virtual disk over a secure network to the client 102. In still other embodiments, the creator 250 can transmit the disk over a secure network using an encrypted network protocol.

In one embodiment, generating an encrypted virtual disk and transmitting it to a client can be accomplished by creating a virtual hard disk and an encrypted drive and storing it on a shared network location. Thus, when users need an encrypted virtual hard disk, the user can download a copy of the secure virtual disk.

In some embodiments, encrypted virtual hard disks may be automatically created and/or delivered to the user based on one or more policies set by an administrator of the system. Once delivered and mounted, in some embodiments, user data may be automatically redirected to the encrypted drive. In other embodiments, the user may manually direct data to the encrypted drive.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for centralized encrypted virtual disk delivery from a server to a client device, the method comprising:

receiving, by a virtual disk creator executing on a server, a request from a policy engine executing on a client device to generate a virtual disk in response to a determination by the client device that the client device does not comprise a secure storage area having an allocated range of secure memory addresses, the request having encryption attributes and machine credentials identifying the client device that transmitted the request, the encryption attributes including an encryption key that includes the machine credentials, and at least one of a type of encryption and an encryption strength;

generating, responsive to the request by the virtual disk creator, the virtual disk responsive to the request and based on disk attributes specified in the request, the request initiated by the client device;

encrypting, responsive to the request by the virtual disk creator, the generated virtual disk using the encryption key and the machine credentials, based on the received request, the received request having encryption attributes including the encryption key and at least one of the type of encryption and the encryption strength;

storing, by the virtual disk creator, a disk identifier, the encryption key, and the machine credentials, to a centralized database;

transmitting, by the virtual disk creator, the encrypted virtual disk to the client device; and receiving, by the server from the client device, an unencrypted backup virtual disk comprising an encrypted disk file of the encrypted virtual disk; and storing, by the server, the backup virtual disk in a backup storage location, the backup virtual disk comprising the encrypted disk file recognized by an operating system of the client device as a backup disk.

2. The method of claim 1, wherein the request to generate a virtual disk from the policy engine executing on the client device comprises one or more of the following: a size of the requested virtual disk and a type of storage.

3. The method of claim 1, further comprising queuing, by the virtual disk creator, the request to generate a virtual disk from the policy engine executing on the client device until the virtual disk creator has availability to respond to the request.

4. The method of claim 1, further comprising transmitting, by the virtual disk creator, the encrypted virtual disk over a secure network using an encrypted network protocol.

5. The method of claim 1, further comprising receiving, by the virtual disk creator, the request from the policy engine executing on the client device responsive to a determination that an application executed by the client device requires a secure storage area.

6. The method of claim 5, further comprising determining that the application requires a secure storage area responsive to the application comprising one of a remote-display protocol client and a streamed application.

7. The method of claim 1, further comprising receiving, by the virtual disk creator, the request from the policy engine executing on the client device responsive to a determination that at least one attribute of a secure storage area existing on the client device does not correspond to a predetermined security requirement.

8. A method of centralized encrypted virtual disk delivery from a server to a client device, comprising:
   receiving, by a virtual disk creator executing on a server, a request from a policy engine executing on a client device to generate a virtual disk in response to a determination by the client device that the client device does not comprise a secure storage area having an allocated range of secure memory addresses, the request having encryption attributes and machine credentials identifying the client device that transmitted the request, the encryption attributes including an encryption key that includes the machine credentials, and at least one of a type of encryption and an encryption strength;
   generating, responsive to the request by the virtual disk creator, the virtual disk responsive to the request and based on disk attributes specified in the request, the request initiated by the client device;
   encrypting, responsive to the request by the virtual disk creator, the generated virtual disk using the encryption key and the machine credentials, based on the received request, the received request having encryption attributes including the encryption key and at least one of the type of encryption and the encryption strength;
   storing, by the virtual disk creator, a disk identifier, the encryption key, and the machine credentials, to a centralized database;
   transmitting, by the virtual disk creator, the encrypted virtual disk to the client device;
   receiving, by the server from the client device, an unencrypted backup virtual disk comprising an encrypted disk file of the encrypted virtual disk; and
   storing, by the server, the backup virtual disk in a backup storage location, the backup virtual disk comprising the encrypted disk file is recognized by an operating system of the client device as a backup disk.

9. The method of claim 8, wherein receiving the unencrypted backup virtual disk comprises receiving the unencrypted backup virtual disk from the client device responsive to a backup policy executed by the client device.

10. The method of claim 8, wherein the request to generate a virtual disk from the policy engine executing on the client device comprises one or more of the following: a size of the requested virtual disk and a type of storage.

11. The method of claim 8, comprising:
   queuing, by the virtual disk creator, the request to generate a virtual disk from the policy engine executing on the client device until the virtual disk creator has availability to respond to the request.

12. The method of claim 8, comprising:
   transmitting, by the virtual disk creator, the encrypted virtual disk over a secure network using an encrypted network protocol.

13. The method of claim 8, comprising:
   receiving, by the virtual disk creator, the request from the policy engine executing on the client device responsive to a determination that an application executed by the client device requires a secure storage area, the application comprising one of a remote-display protocol client and a streamed application.

14. The method of claim 8, comprising:
   receiving the request from a policy engine executing on the client device in response to a determination by the client device that the client device does not comprise a secure storage area having an allocated range of secure memory addresses.

15. A system for centralized encrypted virtual disk delivery from a server to a client device, the system comprising:
   a computing device in communication with a client device, executing a virtual disk creator, the virtual disk creator comprising a processor configured to:
   receive a request sent from a policy engine executing on a client device to generate a virtual disk in response to a determination by the client device that the client device does not comprise a secure storage area having an allocated range of secure memory addresses, the received request including encryption attributes and machine credentials identifying the client device that transmitted the request, the encryption attributes including an encryption key that includes the machine credentials, and at least one of a type of encryption and an encryption strength,
   generate the virtual disk responsive to the request and based on disk attributes specified in the request, the request initiated by the client device,
   encrypt the generated virtual disk, responsive to the request, using the encryption key and the machine credentials, based on the received request, wherein the received request includes encryption attributes including the encryption key and at least one of the type of encryption and the encryption strength, and the encryption key,
   store a disk identifier, the encryption key, and the machine credentials to a centralized database,
   transmit the encrypted virtual disk to the client device,
   receive, by the server from the client device, an unencrypted backup virtual disk comprising an encrypted disk file of the encrypted virtual disk; and
   store, by the server, the backup virtual disk in a backup storage location, the backup virtual disk comprising the encrypted disk file recognized by an operating system of the client device as a backup disk.

16. The system of claim 15, wherein the request to generate a virtual disk from the policy engine executing on the client device comprises one or more of the following: a size of the requested virtual disk and a type of storage.

17. The system of claim 15, wherein the virtual disk creator is further configured to queue the request to generate a virtual disk from the policy engine executing on the client device until the virtual disk creator has availability to respond to the request.

18. The system of claim 15, wherein the virtual disk creator is further configured to transmit the encrypted virtual disk over a secure network using an encrypted network protocol.

19. The system of claim 15, wherein the virtual disk creator is further configured to receive the request from the policy engine executing on the client device responsive to a determination that an application executed by the client device requires a secure storage area.

20. The system of claim 19, wherein the application executed by the client device comprises one of a remote-display protocol client and a streamed application.

21. The system of claim 15, wherein the virtual disk creator is further configured to receive the request from the policy engine executing on the client device responsive to a determination that at least one attribute of a secure storage area existing on the client device does not correspond to a predetermined security requirement.

22. The system of claim 15, wherein the backup service is configured to receive the unencrypted backup virtual disk from the client device, the unencrypted backup virtual disk sent responsive to a backup policy executed by the client device.

* * * * *